O. W. STEARNS.
Eaves-Trough.

No. 168,934.  Patented Oct. 19, 1875.

WITNESSES:  
Francis McArdle  
A. F. Terry

INVENTOR:  
O. W. Stearns  
BY  
ATTORNEYS.

UNITED STATES PATENT OFFICE.

OTIS W. STEARNS, OF JOHNSON, VERMONT.

IMPROVEMENT IN EAVES-TROUGHS.

Specification forming part of Letters Patent No. 168,934, dated October 19, 1875; application filed September 11, 1875.

*To all whom it may concern:*

Figure 1:
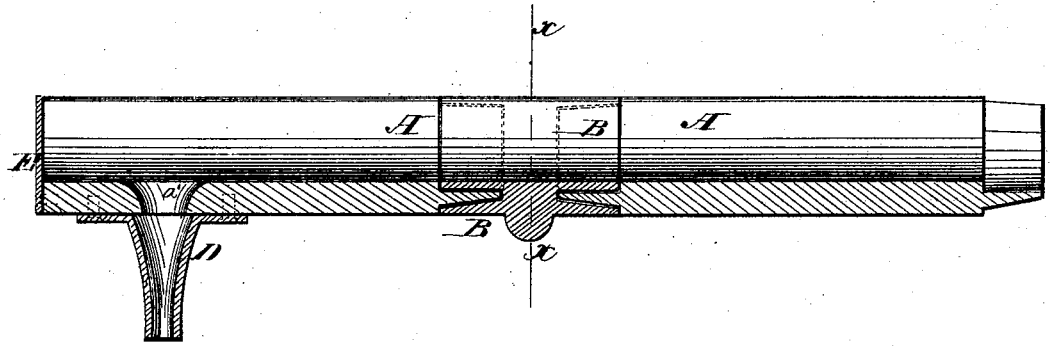
Figure 2:
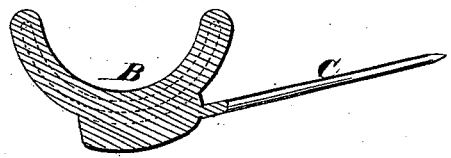

Be it known that I, OTIS W. STEARNS, of Johnson, in the county of Lamoille and State of Vermont, have invented a new and useful Improvement in Eaves-Troughs, of which the following is a specification:

Figure 1 is a longitudinal section of my improved eaves-trough. Fig. 2 is a central cross-section of the coupling, taken through the line $x$ $x$, Fig. 1.

Similar letters of reference indicate corresponding parts.

The object of this invention is to furnish an improved eaves-trough, which shall be made in sections, put together with couplings, so that it may be conveniently put up, and may be made of any desired length.

The invention consists in the eaves-trough, formed of the semi-cylindrical sections, made with half-ring tenons upon their end or ends, and the semi-cylindrical couplings, made with half-ring sockets in their edges, and provided with spikes for securing them to the wall.

A are the semi-cylindrical sections, which may be made of wood or other suitable material, and upon the ends of which are formed half-ring tenons, which fit into half-ring grooves in the edges of the couplings B. The couplings B are cast upon, or otherwise secured to, a spike, C, to be inserted in the wall of the building. In one of the sections A is formed a hole, $a'$, for the water to escape through; and to the lower side of said section is attached a short spout, D, to receive the upper end of the pipe by which the water is conducted to the ground. The spout D is made with a semi-cylindrical flange upon its upper end, to enable it to be readily secured to the section A.

When the trough has been made of the proper length the ends of the end sections A are cut off square, and plates E are secured to them.

Having thus described my invention, I claim as new and desire to secure by Letters Patent—

The eaves-trough formed of the semi-cylindrical sections A, made with half-ring tenons upon their end or ends, and the semi-cylindrical couplings B, made with half-ring sockets in their edges, and provided with spikes C, substantially as herein shown and described.

OTIS W. STEARNS.

Witnesses:
SEWELL NEWTON,
CHARLES H. STEARNS.